United States Patent
Torchalski et al.

(10) Patent No.: US 7,498,942 B2
(45) Date of Patent: Mar. 3, 2009

(54) PRINTER AND SYSTEM FOR DETECTING VOID RFID TRANSPONDERS SUPPORTED IN A PRINTING MEDIA AND COMMUNICATING THE SAME

(75) Inventors: Karl Torchalski, Arlington Heights, IL (US); William Shuff, Glenview, IL (US); Anthony Brown, Grayslake, IL (US); Daniel F. Donato, Johnsburg, IL (US); Martin Schwan, Chicago, IL (US)

(73) Assignee: ZIH Corporation, Hamilton (BM)

( * ) Notice: Subject to any disclaimer, the term of this patent is extended or adjusted under 35 U.S.C. 154(b) by 236 days.

(21) Appl. No.: 11/379,175

(22) Filed: Apr. 18, 2006

(65) Prior Publication Data

US 2006/0232411 A1    Oct. 19, 2006

Related U.S. Application Data

(60) Provisional application No. 60/672,627, filed on Apr. 19, 2005.

(51) Int. Cl.
 *G08B 13/14* (2006.01)
(52) U.S. Cl. .................................... 340/572.1
(58) Field of Classification Search ... 340/572.1–572.9; 235/462.01
 See application file for complete search history.

(56) References Cited

U.S. PATENT DOCUMENTS 6,593,853 B1* 7/2003 Barrett et al. ............ 340/572.1
7,114,654 B2* 10/2006 Chapman et al. ........ 235/462.01
7,273,165 B2* 9/2007 Satake et al. ................ 235/375
7,298,266 B2* 11/2007 Forster ..................... 340/572.1
2003/0063001 A1* 4/2003 Hohberger et al. ....... 340/572.1
2005/0058483 A1* 3/2005 Chapman et al. ............. 400/76
2006/0071796 A1* 4/2006 Korzeniewski ........... 340/572.8

* cited by examiner

*Primary Examiner*—Phung Nguyen
(74) *Attorney, Agent, or Firm*—Alston & Bird LLP

(57) ABSTRACT

A printer controller system for controlling printing on media (e.g., a strip of labels) supporting a series of RFID transponders and for communicating detection of void RFID transponders to downstream devices. The printer controller system includes a void detection system for detecting void RFID transponders, a printing system for controlling printing to the media and a void communication system for communicating detection of the void RFID transponder to downstream devices. This allows the downstream device, such as a label peeler, to anticipate the void RFID transponder and deal with it accordingly. The printer controller may include a media advancement system that is configured to continue advancing the media and RFID transponders past the print head even when the RFID transponder is detected and avoid slowing the printing process. The printer controller system may be configured to submit void indicia to a print head and recommunicate a formatted image when a RFID transponder has been voided.

27 Claims, 11 Drawing Sheets

FIGURE 6

| Pin No. | Signal Name | Signal Type | Description |
|---|---|---|---|
| 1 | I/O SIGNAL GROUND | I/O Signal Ground | +5 V Version<br>Using jumber J5, this pin can be configured as isolated or non-isolated from the Applicator Interface Circuit Ground. See Table 20 on page 170 for more information.<br><br>24-28 V Version<br>Isolated I/O operation only. No jumpers to configure. |
| 2 | +V I/O | Power | +5 V Version<br>Using jumper J4, this pin can be configured as isolated or non-isolated from the Applicator Interface Circuit +5 V Supply. See Table 20 on page 170 for more information.<br><br>24-28 V Version<br>Isolated I/O operation only. No jumpers to configure. |
| 3 | START PRINT | Input | Pulse Mode<br>The label printing process begins on the HIGH to LOW transition of this signal if a format is ready. De-assert this signal to HIGH to inhibit printing of a new label.<br><br>Level Mode<br>Assert LOW to enable the print engine to begin printing if a format is ready. The print engine prints new labels as long as the signal is asserted. When de-asserted, the currently printing label is completed and the print engine stops and waits for this input to be reasserted to LOW. |
| 4 | FEED | Input | When the print engine is in an idle state or has been paused, assert this input LOW to trigger repeated feeding of blank labels. De-assert HIGH to stop feeding blank labels and register to the top of the next label. |
| 5 | PAUSE | Input | To toggle the current pause state, this input must be asserted LOW for 200 milliseconds, or until the SERVICE REQUIRED output (pin 10) changes state. |
| 6 | REPRINT | Input | If the Reprint feature is enabled, this input must be asserted LOW to cause the print engine to reprint the last label. See *Set Reprint Mode* on page 71 for more information.<br><br>If the Reprint feature is disabled, this input is ignored. |
| 7 | +28 V | Power | The Interface Power Supply. Supplies power to external sensors as required. |
| 8 | POWER GROUND (+28 V Return) | Ground | The Interface Power Ground. |
| 9 | RIBBON LOW | Output | Asserted HIGH if the Ribbon Low feature is enabled and the amount of ribbon remaining on the supply spool is below a specific threshold level. See *Set Ribbon Low Mode* on page 70 for more information.<br><br>If the Ribbon Low feature is disabled, this output lead is disabled. |
| 10 | SERVICE REQUIRED | Output | Asserted LOW if the media cover is open, the printhead is open, the ribbon is out, the media is out, the print engine is paused, or an operational fault occurs.<br>If the applicator Resynch mode is set to Error mode, this signal also asserts LOW for a Resynch error. |
| 11 | END PRINT | Output | MODE 0: The applicator port is OFF.<br>MODE 1: Asserted LOW only while the print engine is moving the label forward; otherwise de-asserted HIGH.<br>MODE 2: Asserted HIGH only while the print engine is moving the label forward; otherwise de-asserted LOW.<br>MODE 3: (Default) Asserted LOW for 20 milliseconds when a label has been completed and positioned. Not asserted during continuous printing.<br>MODE 4: Asserted HIGH for 20 milliseconds when a label has been completed and positioned. Not asserted during continuous printing. |
| 12 | MEDIA OUT | Output | Asserted LOW while there is no media in the print engine. |
| 13 | RIBBON OUT | Output | Asserted LOW while there is no ribbon in the print engine. |
| 14 | DATA READY- | Output | Asserted LOW when sufficient data has been received to begin printing the next label.<br><br>De-asserted HIGH whenever printing stops after the current label, due to either a pause condition or the absence of a label format. |
| 15 | VOID | Output | Asserted LOW when the RFID transponder over the antenna is "voided."<br><br>De-asserted HIGH when the end print signal is asserted. |

FIGURE 8

| label format sent | label format processed | waiting for start print signal | label prints | ready for next label |
|---|---|---|---|---|

FIGURE 9

| label format sent | label format processed | waiting for start print signal | void label prints (if applicable) | ready for next label format or to retry same format |
|---|---|---|---|---|
| | | | | (next label) |
| | | | | (retry) |

FIGURE 12

| | label format sent | label format processed | waiting for start print signal | label prints | ready for next label | |
|---|---|---|---|---|---|---|
| NOT READY | | | | | | NOT READY |
| START PRINT | | | | | | GO SIGNAL |
| END PRINT | | | | | | GO SIGNAL |
| VOID | | | | | | VOID |

FIGURE 13

| | label format sent | label format processed | waiting for start print signal | void label prints (if applicable) | ready for next label format or to retry same format | |
|---|---|---|---|---|---|---|
| NOT READY | | | | | (next label) (retry) | NOT READY |
| START PRINT | | | | | | GO SIGNAL |
| END PRINT | | | | | | GO SIGNAL |
| VOID | | | | | | VOID |

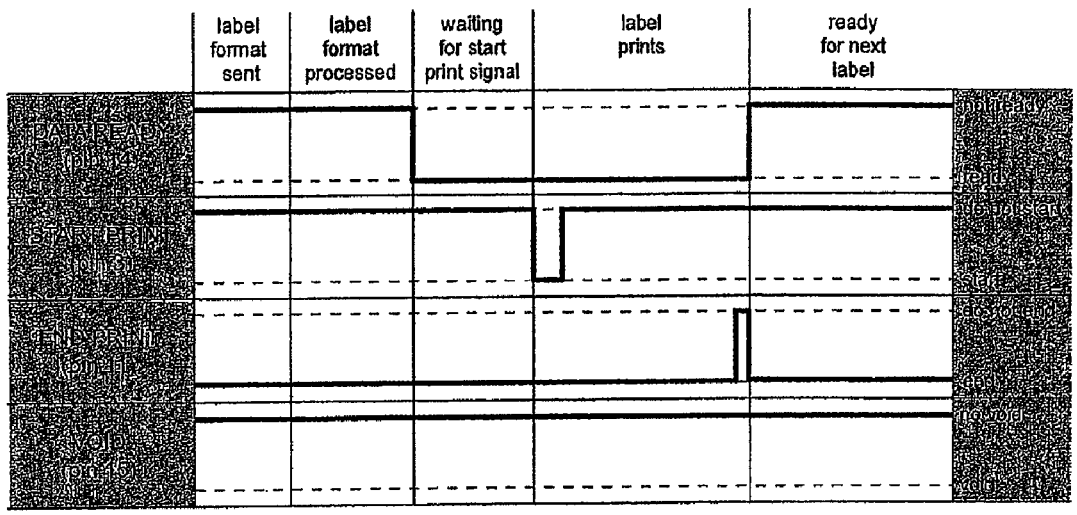

PRINTER AND SYSTEM FOR DETECTING VOID RFID TRANSPONDERS SUPPORTED IN A PRINTING MEDIA AND COMMUNICATING THE SAME

CROSS-REFERENCE TO RELATED APPLICATIONS

The present invention claims priority to provisional U.S. Patent Application Ser. No. 60/672,627 filed on Apr. 19, 2005 entitled "PRINTER AND SYSTEM FOR DETECTING VOID RFID TRANSPONDERS SUPPORTED IN A PRINTING MEDIA AND COMMUNICATING THE SAME" which is hereby incorporated herein, in its entirety, by reference.

BACKGROUND OF THE INVENTION

1. Field of the Invention

The present invention is related to the printing and encoding of labels (or other media) with embedded radio frequency identification (RFID) tags, and more particularly, to printers that ensure the RFID tags are appropriately encoded during label printing.

2. Description of Related Art

UHF radio frequency identification (RFID) technology allows wireless data acquisition and or transmission from and or to active (battery powered) or passive RFID transponders using a backscatter technique. To communicate with, i.e., "read" from and or "write" commands and/or data to an RFID transponder, the RFID transponder is exposed to an RF electromagnetic field by the transceiver that couples with and energizes (if passive) the RFID transponder through electromagnetic induction and transfers commands and data using a predefined "air interface" RF signaling protocol.

When multiple passive RFID transponders are within the range of the same RF transceiver electro-magnetic field they will each be energized and attempt to communicate with the transceiver, potentially causing errors in "reading" and or "writing" to a specific RFID transponder in the reader field. Anti-collision management techniques exist to allow near simultaneous reading and writing to numerous closely grouped RFID transponders in a common RF electromagnetic field. However, anti-collision management increases system complexity, cost and delay response. Furthermore, anti-collision management is "blind" in that it cannot recognize where a specific RFID transponder being processed is physically located in the RF electro-magnetic field, for example, which RFID transponder is located proximate the print head of a printer-encoder.

One way to prevent errors during reading and writing to RFID transponders without using anti-collision management is to isolate a specific RFID transponder of interest from nearby RFID transponders. Previously, isolation of RFID transponders has used RF-shielded housings and/or anechoic chambers through which the RFID transponders are individually passed for personalized exposure to the interrogating RF field. This requires that the individual RFID transponders have cumbersome shielding or a significant spatial separation.

RFID printers-encoders have been developed which are capable of on-demand printing on labels, tickets, tags, cards or other media with which an RFID transponder is attached or embedded. These printer-encoders have a transceiver for on-demand communication with the RFID transponder on the individual media to read and/or store data into the attached RFID transponder. For the reasons given, it is highly desirable in many applications to present the media on rolls or other format in which the RFID transponders are closely spaced. However, close spacing of the RFID transponders exacerbates the task of serially communicating with each individual RFID transponder without concurrently communicating with neighboring RFID transponders on the media. This selective communication exclusively with an individual RFID transponder is further exacerbated in printers-encoders designed to print on the media in or near the same space as the RFID transponder is positioned when being interrogated.

UHF RFID transponders may operate in, for example, the 902-928 MHz band in the United States and other ISM bands designated in different parts of the world. For example, in FIG. 1 a conventional one-half wavelength "Forward Wave" microstrip prior art coupler 3 consisting of, for example, a rectangular conductive strip 5 upon a printed circuit board 7 having a separate ground plane 9 layer configured for these frequencies. One end of the conductive strip 5 is connected to transceiver 42 and the other end is connected through terminating resistor 8 to ground plane 9. The conductive strip 5 as shown in FIG. 1 has a significant width due to RF design requirements imposed by the need to create acceptable frequency response characteristics. This type of prior art coupler 3 has been used with UHF RFID transponders that are relatively large compared to the extent of prior art coupler 3.

As shown by FIGS. 2a and 2b, recently developed RFID transponders 1, designed for operation at UHF frequencies, have one dimension so significantly reduced, here for example a few millimeters wide, that they will be activated upon passage proximate the larger prior art coupler 3 by electro-magnetic power leakage 10 concentrated at either side edge of the conductive strip 5 of prior art coupler 3. In FIG. 2A, the two leakage regions "A" and "B" defined by electro-magnetic power leakage 10 are small and relatively far apart, increasing system logical overhead and media conveyance positioning accuracy requirements. If the RFID transponders 1 were placed close together, then multiple RFID transponders 1 might be activated by the physically extensive one-half wavelength "Forward Wave" microstrip prior art coupler 3.

Competition in the market for such "integrated" printer-encoder systems as well as other RFID interrogation systems has focused attention on the ability to interrogate with high spatial selectivity any RFID transponder from a wide range of available RFID transponders having different sizes, shapes and coupling characteristics as well as minimization of overall system, media size, and RFID transponder costs. In addition, this high spatial selectivity and wide range of available RFID transponders must be balanced with the need for the integrated printer-encoder system to be able to read and encode RFID transponders of varying configurations at different locations on the media.

The need to read and encode RFID transponders embedded in printer media with high selectivity is addressed by commonly-owned U.S. patent application Ser. No. 10/981,967 entitled "SYSTEM AND METHOD FOR DETECTING TRANSPONDERS USED WITH PRINTER MEDIA" filed on Nov. 5, 2004 which is hereby incorporated herein in its entirety by reference. In this application, a calibration apparatus employs a transceiver that varies its power and a controller that varies the position of the media and RFID transponders to determine the location of the RFID transponders. These locations are then used to instruct communication with the RFID transponders and avoid communicating with closely spaced adjacent RFID transponders.

Despite improvements in the ability of integrated printer-encoder systems to selectively read, encode and otherwise communicate with differently located RFID transponders, the possibility remains that communication will not be established with each RFID transponder. For example, occasional RFID transponders may have defects and therefore be incapable of being written to, or read from, or may result in corruption of the written or read information. In addition, the defective RFID transponders typically interrupt the smooth flow of printing and encoding the labels.

Therefore, it would be advantageous to have a printer-encoder system that is capable of reading and encoding a large number of types of RFID transponders, including closely spaced RFID transponders, and printing on media supporting the RFID transponders, while still ensuring that improperly encoded or defective RFID transponders are discarded or remain unused. In addition, it would be advantageous to have a printer-encoder system equipped to respond to improperly encoded or defective RFID transponders with minimal interruption of printing and encoding operation.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2b is a partial cut-away top schematic view of the prior art forward wave coupler and carrier substrate with embedded RFID transponders of FIG. 2a;

FIG. 6 is a table of pin configurations of a connector of the controller circuit board of FIG. 5;

FIGS. 8-15 are output diagrams of selected pins of the connector of the controller circuit board of FIG. 5.

DETAILED DESCRIPTION OF THE INVENTION

Figure 1:
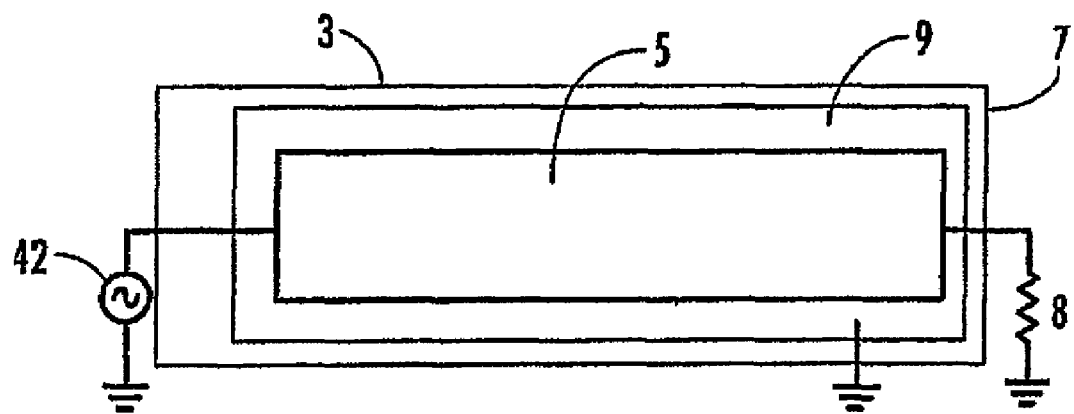
FIG. 1 is a top view of a microstrip forward wave coupler of the prior art.
Figure 2A:
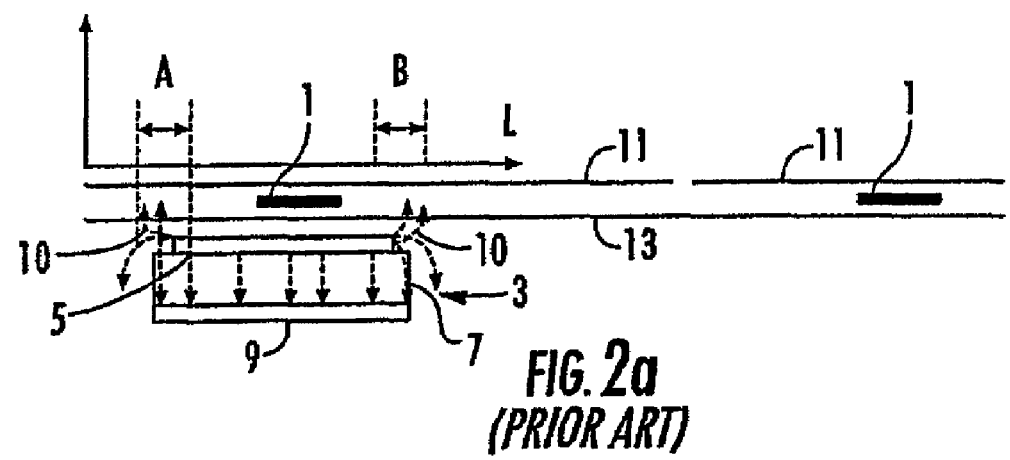
FIG. 2a is a simplified cut-away side view of an RFID transponder-coupler structure using a prior art forward wave coupler as shown in FIG. 1.
Figure 2B:
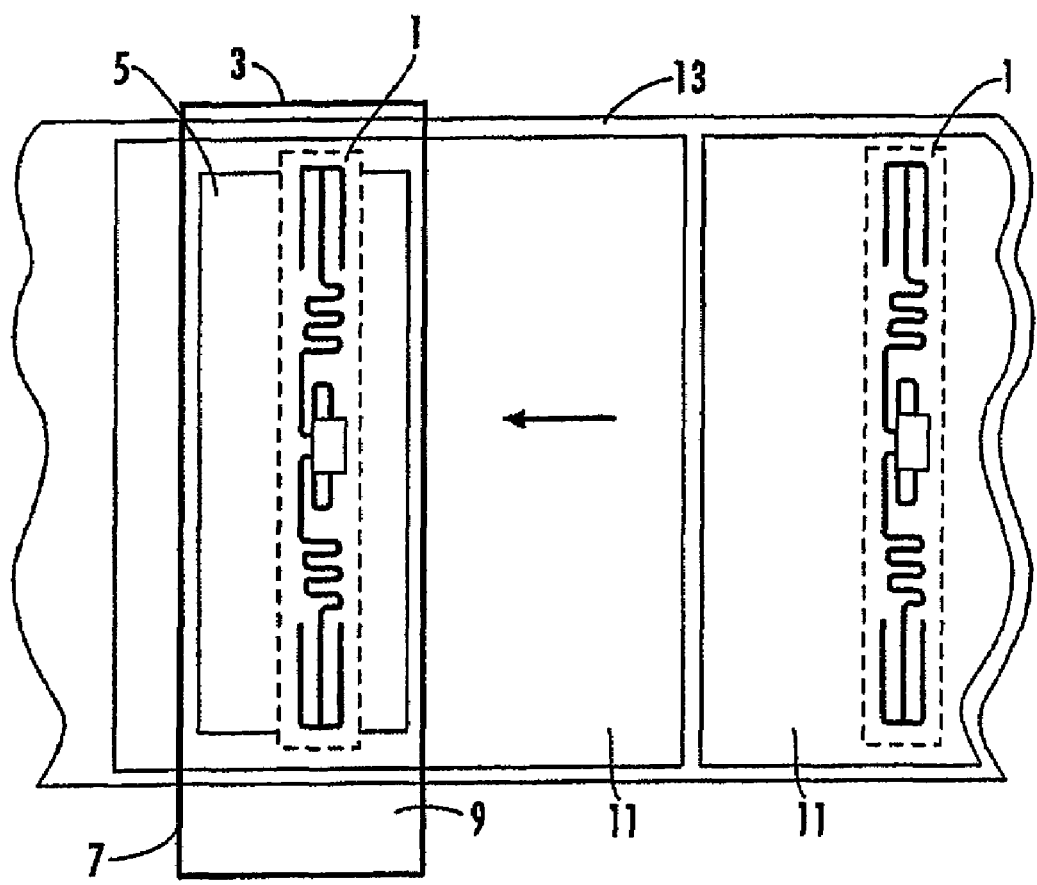

The present invention addresses the above needs, and achieves other advantages, by providing a printer controller system for controlling printing on media (e.g., a strip of labels) supporting a series of RFID transponders and for sending an external signal communicating detection of void RFID transponders to external downstream devices. Generally, the printer controller system includes a void detection system for detecting void RFID transponders supported by the media, a printing system for controlling printing to the media and a void communication system for communicating detection of the void RFID transponder to the external downstream devices. The use of an external signal advantageously allows use with a range of different downstream devices without modification of the printer or printer controller system. This allows the downstream device, such as a label peeler, to anticipate the void RFID transponder and deal with it accordingly with a minimal amount of interruption of the printing and encoding stages. Also, the printer controller may include a media advancement system that is configured to continue advancing the media and RFID transponders past the print head even when the RFID transponder is detected and avoid slowing the printing process. Also, the printer controller system may be configured to submit void indicia to the print head for printing on the voided indicia and re-communicate a formatted image when an RFID transponder has been voided.

In one embodiment, the present invention includes a printer controller system for controlling printing on media supporting a series of RFID transponders and communicating detection of void RFID transponders to one or more downstream devices. Included in the printer controller is a void detection system configured to communicate with a transceiver for detecting a void one of the RFID transponders supported by the media. A printing system is configured to process and communicate a formatted image (e.g., a label image) to a print head for printing on the media in proximity to one of the RFID transponders supported by the media. A void communication system is configured to communicate at least one signal indicating detection of the void RFID transponder to the downstream device.

In another aspect, the printer controller may also include a media advancement controller configured to continuously advance the media and RFID transponders even when the void RFID transponder is detected. For example, the media advancement controller may be configured to advance to a next RFID transponder supported on the media and the printing system may be further configured to re-communicate the formatted image to the print head in response to detection of the void RFID transponder.

An end print detection system may be included that is configured to determine and communicate when printing of the formatted image on the media is completed. In response to non-detection of the void RFID transponder and completed printing of the formatted image, the printing system may be configured to communicate a next formatted image.

In another aspect, the printing system may be further configured to process and communicate void indicia to the print head in response to detection of the void RFID transponder.

In another embodiment, the above-listed controller and its aspects may be incorporated into a printer that includes the print head configured to print on the media, the transceiver configured to communicate with the RFID transponders on the media and a media supply system configured to advance the media past the print head and the transceiver in response to commands from the printer controller.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

The present invention includes an apparatus and method for detecting and voiding, or avoiding, improperly encoded or otherwise defective RFID transponders embedded in label or other printer media. Generally, the present invention includes a control system for a printer that is configured to detect a defective RFID transponder and instruct downstream components or devices, such as a label applicator, to avoid or void the media containing the defective RFID transponder. Advantageously, the control system is configured to instruct the downstream components or devices by sending an external signal that communicates the void status of a label, such as through one or more pins of a plug connection. The term downstream is used herein in a time-relative sense and not necessarily in a spatial sense, e.g., communication of a detected void label could be sent to an upstream device such as a media supply mechanism for instructing its operation.

The invention is useful in the reading and or data loading of RFID transponders, such as UHF RFID transponders, for example on an assembly line, in distribution centers or warehouses where on-demand RFID labeling is required, and in a variety of other applications. In many applications an RFID transponder or a number of RFID transponders are mounted or embedded on or in a label, ticket, tag, card or other media carried on a liner or carrier. It is often desirable to be able to print on the media before, after, or during communication with an RFID transponder. Although this invention is disclosed here in a specific embodiment for use with a direct thermal or thermal transfer printer, it may also be used with any type of RFID interrogation device or other types of printers using other printing technologies, including inkjet, dot-matrix, and electro-photographic methods.

Frequencies of operation for the RF tag protocols herein include those in the 13.56 MHz (HF) space as well as UHF, but the present invention as described herein is not meant to be limited to any particular communication protocol. In some applications, a print station may be at a distance from the RFID transceiver. In others, it may be necessary to accomplish the print function in the same target space occupied by the RFID transponder when it is being interrogated.

Figure 3:
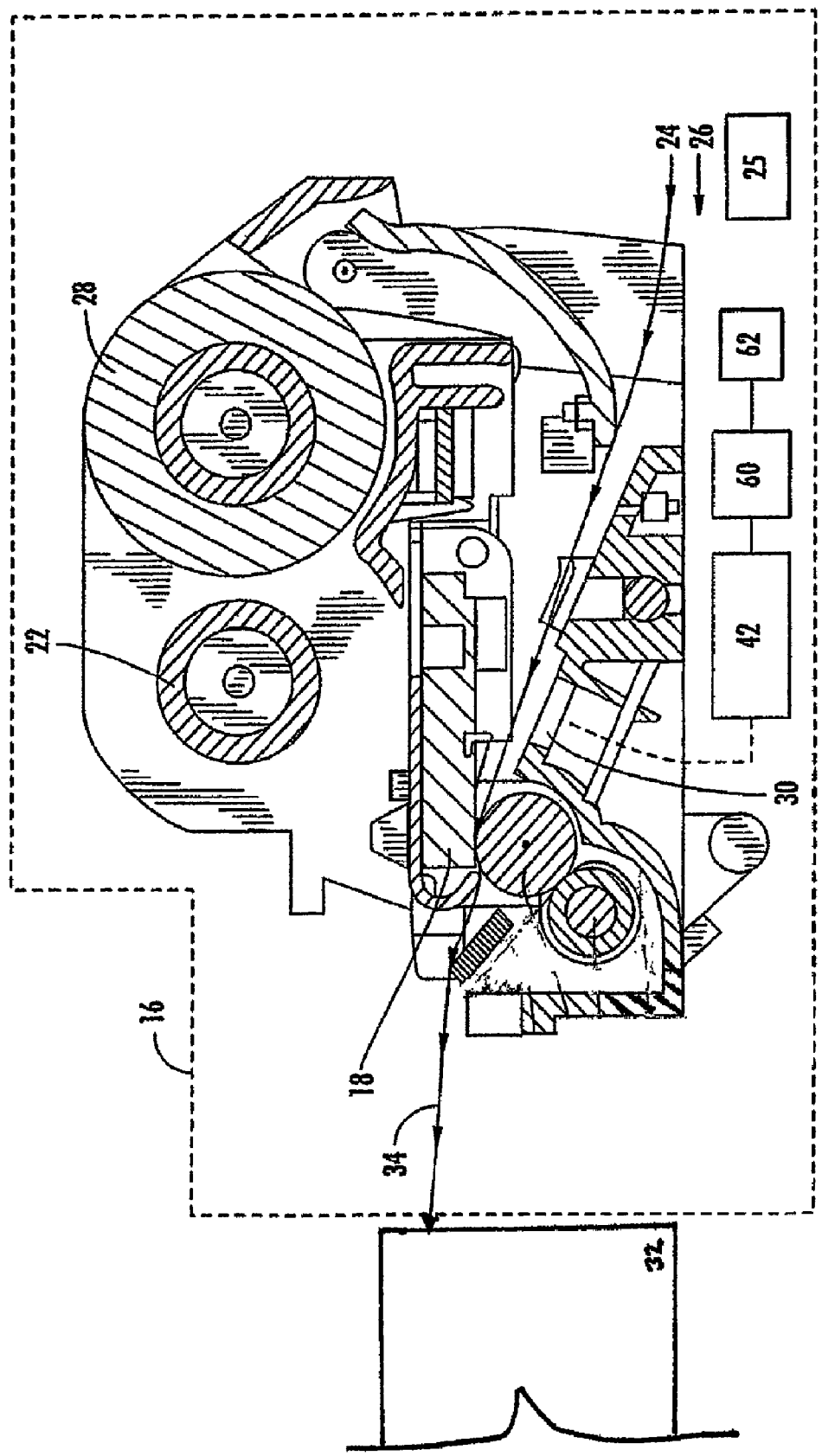
FIG. 3 is a schematic of a printer of one embodiment of the present invention configured for detecting voided RFID transponders and communicating said detection.

For example, an implementation of the invention in a thermal transfer media printer 16 in which both printing and RFID transponder communication are accomplished, but at different locations in the media printer 16, is shown in FIG. 3. The media printer 16 includes a printhead sub-assembly comprising a conventional thermal printhead 18 and platen roller 19, such as a direct thermal printer for printing on thermally-sensitive media.

A web 24 of media 11, such as labels, tickets, tags or cards, is directed along a feed path 26 under the printhead 18 where on-demand printing of text, bar codes and/or graphics takes place under control of a computer or microprocessor 21 in a controller system 60. The controller system 60 can be a printer controller that controls other functions of the printer 16, such as the operation of the print head 18, delivery of the web 24 of media 11, and the like. The controller system 60 can operate according to predetermined instructions, such as a software program that is stored in a memory 62.

The media printer 16 also includes a transceiver 42 for generating RF communication signals that are fed to a frequency and (preferably) spatially selective microstrip near field coupler 30 located proximate the media feed path 26. Notably, the term "coupler" is used herein interchangeably with the term "antenna" and neither term should be construed as excluding the other.

Figure 4:
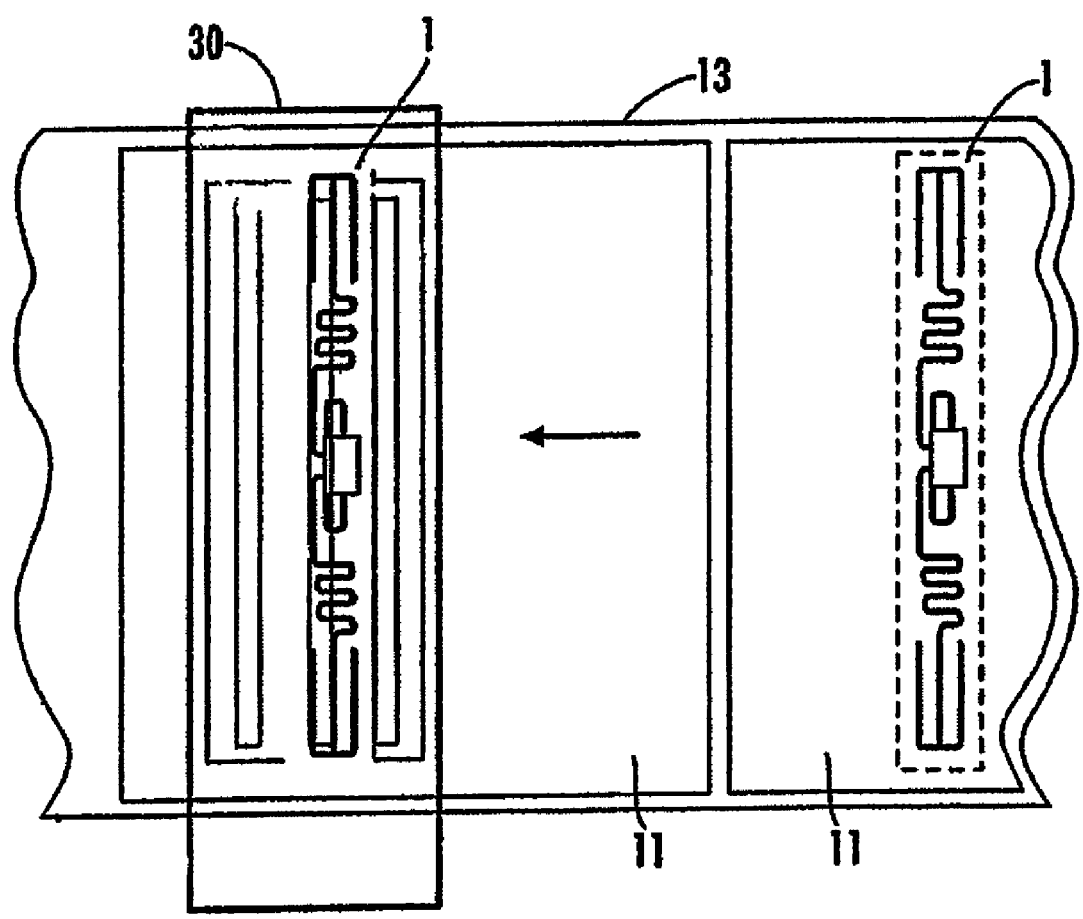
FIG. 4 is a partial cut-away top schematic view of a coupler and carrier substrate with embedded RFID transponders of the printer of FIG. 3.

As labels or other media 11 with embedded RFID transponders 1 (as shown in FIG. 4) move along the media feed path 26 under the control of the microprocessor 12 of the controller system 60 and through the RFID transponder operating region, data may be read from and or written to each RFID transponder 1 by the coupler 30 and transceiver 42. Information indicia then may be printed upon an external surface of the media 11 as the media passes between the platen roller 19 and the printhead 18 by selective excitation of the heating elements in the printhead 18. When the media printer 16 is configured as a direct thermal printer, the heating elements form image dots by thermochromic color change in the heat sensitive media.

When the media printer 16 is configured for use as a thermal transfer printer, a ribbon supply roll 28 delivers a thermal transfer ribbon (not shown for clarity) between printhead 14 and the media on web 24. The ink dots are formed by melting ink from the thermal transfer ribbon (not shown for clarity) delivered between printhead 18 and the media on web 24 from ribbon supply roll 28. Patterns of printed dots thus form the desired information indicia on the media 11, such as text, bar codes or graphics. After use, the spent ribbon is collected on a take-up reel 22. After being printed, the media 11 follows a media exit path 34 and may be peeled off the underlying carrier substrate 13 at a downstream peeling station 32 (as shown in the illustrated embodiment) or may be processed by some additional or further downstream device, such as an applicator that can apply the peeled label to a target and divert voided labels to a different target For example, the downstream device may be a cutter for cutting or trimming the media 11, or a laminator for laminating the media. Also, in the illustrated embodiment, the peeling station 32 is shown as a separate modular device attached to the media printer 16. However, the downstream device could be fully or partially integrally constructed with the media printer 16, and even can share components with the media printer. Regardless of the configuration of the peeling station 32 or other downstream devices, these downstream devices are connected in at least partial communication with the controller system 60 of the present invention which is discussed in more detail below.

Media conveyance is well known in the art. Therefore the media conveyance 25 portion of the printer that drives the media with RFID transponders along the media feed path 26 is not described in detail.

Figure 5:
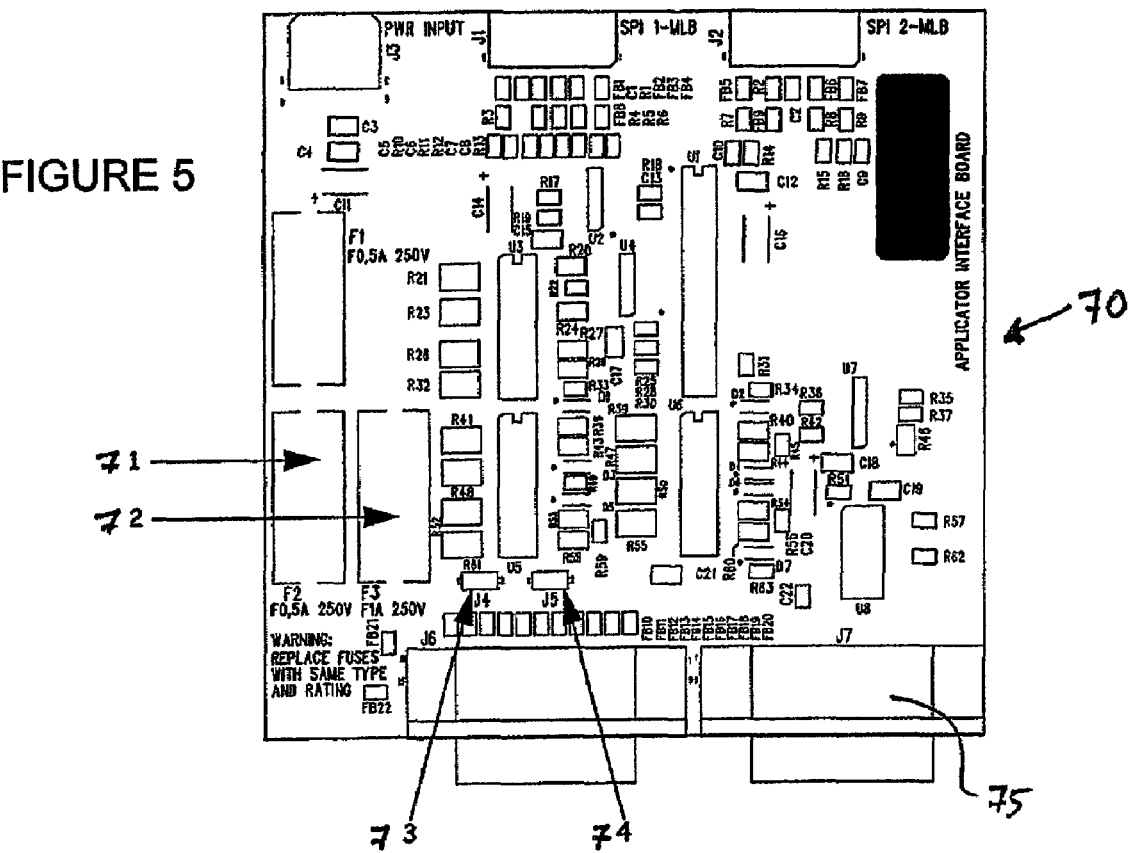
FIG. 5 is a plan view of a controller circuit board of the printer of FIG. 3.

The controller system 60 of an embodiment of the present invention includes an applicator interface board 70, as shown in FIG. 5. The applicator interface board includes a first fuse 71, a second fuse 72, a first jumper 73 and a second jumper 74, and one or more connectors. In the illustrated embodiment, one of a pair of connectors is a fifteen (DB-15) pin connector 75 configured to have the functions shown in the table of FIG. 6.

Although the illustrated embodiment of the present invention shows a single board, the operations of the board can be distributed over a range of hardware, software and firmware. In addition, the term controller as use herein covers various types of devices for performing the disclosed functions. For example, the controller may be in the form of a general processor operating in conjunction with software. Further, the controller may be an applications specific integrated circuit (ASIC) that is designed to perform the functions in analog.

As a further note, the signal polarity and duration, start and stop points described below, although preferred, are only one embodiment of the present invention. Other variants exist that can accomplish similar communication as long as some external signal is provided to communicate a voided label to downstream devices.

Referring again to FIGS. 5 and 6, with the first jumper 73 (also referenced as J4) in the IN position, a +5 V I/O is connected to the applicator interface board 70 +5 V supply. With the first jumper 73 in the OUT position, the +5 V I/O is disconnected from the applicator interface board 70 +5 V supply. The +5 V for the applicator interface optoisolator circuits is provided externally to this pin. In other words, an external voltage other than 5V can be supplied to the interface board with proper external precaution.

With the second jumper 74 (also referenced as J5) in the IN position, the I/O ground is connected to the ground of the applicator interface board 70. With the second jumper 74 in the OUT position, the I/O ground is disconnected from the applicator interface circuit ground. Ground for the applicator interface optoisolator circuits is provided externally to this pin.

Pin 1 of the connector 75 is configured to pass an input-output ground signal. Using the second jumper 74 in a 5 V version, pin 1 can be configured as isolated or non-isolated from the ground line of the applicator interface board 70. In a 24-28 V version, pin 1 can only be configured as isolated and no jumpers are involved.

Pin 2 is a positive voltage power signal. In the 5 V version of the applicator interface board 70, the first jumper 73 can be configured as isolated or non-isolated from the applicator interface board's +5 V power supply. In the 24-28 V version, there are no jumpers to configure and only isolated operation of the pin 2 power signal occurs.

Pin 3 is a start print input signal that includes a pulse mode or a level mode. In the pulse mode, the label or media printing process begins on the HIGH to LOW transition of the signal when the label or media format is ready. In the level mode, LOW is asserted to enable the print engine to begin printing when the label or media format is ready. As long as LOW is asserted, the controller 60 prints new labels. When de-asserted, the currently printing label is completed and the print engine (e.g., the print head 14 and associated driving components of the controller 60) stops and waits for this input to be reasserted LOW.

Pin 4 is a feed indicator input to the controller 60 wherein a LOW input triggers repeated feeding of blank labels or media when the print engine is in the idle state or has been paused. De-assertion of HIGH on pin 4 stops feeding of blank labels and registers to the top of the next label. Pin 5 is a pause input to the controller 60 that toggles to a pause state. For example, assertion of LOW for 200 milliseconds through Pin 5, or until the "service required" output of pin 10 changes state, toggles into the pause state.

Pin 6 is a reprint input which, if enabled by assertion to LOW, causes the print engine to reprint the last label. If a reprint feature is disabled, this input is ignored. Pin 7 is a 28 V power signal that is connected to a power supply. Pin 8 is a power ground for the 28 V power supply. Pin 9 communicates a low ribbon output signal. Pin 9 is asserted HIGH if a ribbon low feature is enabled and the amount of ribbon remaining on the supply roll 28 is below a specific threshold level. If the ribbon low feature is disabled, then the output of pin 9 is disabled.

Pin 10 is the service required output and is asserted LOW under several conditions that render the media printer 16 inoperable such as a cover being open, the thermal printhead 18 being open, the ribbon supply roll 28 being empty, the media 11 running out, pausing of the print engine with pin 4 input, or some type of operational fault occurs. If a resynchronize mode of the applicator is set to an error mode, the pin 10 also asserts LOW for a resynchronize error.

Pin 11 is configured to communicate output about actual printing operation and can have several modes. In a MODE 0, the applicator port is OFF. In MODE 1, the output is asserted LOW only while the print engine is moving the label forward, otherwise the output is de-asserted to HIGH. In MODE 2, the output is asserted HIGH only while the print engine is moving the label forward. Otherwise, pin 11 is de-asserted to LOW. In MODE 3, which is a default mode, pin 11 is asserted LOW for 20 milliseconds when an individual label has been completed and positioned. De-assertion to HIGH occurs during continuous printing. In MODE 4, pin 11 is asserted HIGH for 20 milliseconds when a label has been completed and positioned and is de-asserted to LOW during continuous printing.

Pin 12 is a media out output that is asserted LOW when there is no media in the print engine. Pin 13 is a ribbon out output and is asserted LOW while there is no ribbon in the print engine. Pin 14 is a data ready output and is asserted LOW when sufficient data has been received to begin printing the next label. It is de-asserted to HIGH when printing stops after a current label (or media portion), due either to a pause condition or the absence of a label format. Pin 15 is a void output that is asserted LOW when the RFID transponder 1 over the coupler 30 and transceiver 42 is voided, and is de-asserted HIGH when the end print signal is asserted.

Preferably, the controller system 60 of the present invention is configured to communicate via the fifteen pin connector 75, or other types of connectors (e.g., a DB-9 connector), with a label applicator 32 or other downstream device in order to instruct handling of defective RFID transponders. In particular, the controller may be configured to communicate via selected pins of the connector 75 in a manner that allows the downstream device to anticipate and handle the defective RFID transponders 1, such as by not applying a label with the defective RFID transponder. With respect to the embodiments of the present invention described below, printing on the combined label or media strip with RFID transponders 1 is coordinated with voiding or not voiding labels (or other media portions) based on a successful or unsuccessful reading or writing of the RFID transponders 1 by the coupler 30 and transceiver 42 as the media strip is advanced thereby. Notably, the media can be stationary during encoding.

Figure 7:
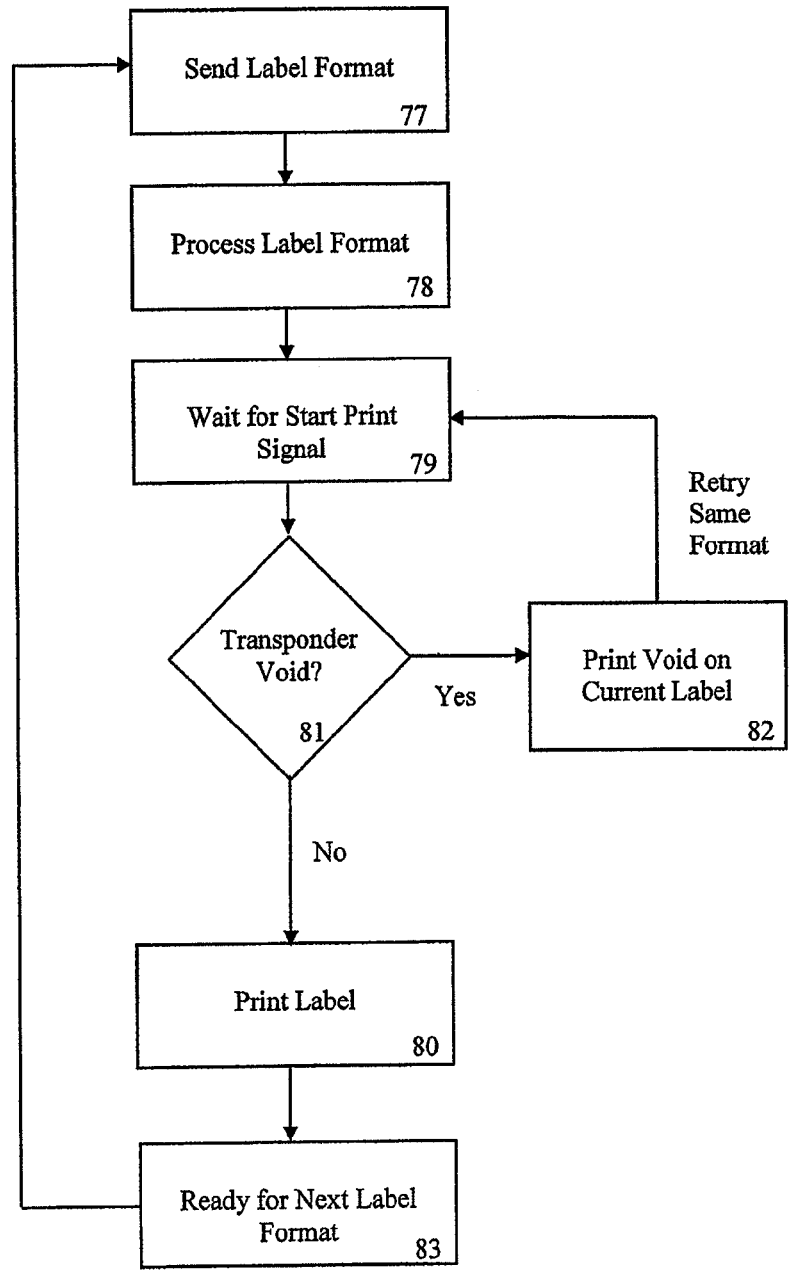
FIG. 7 is a flow diagram of operation of a controller of the printer of FIG. 3.

For example, the controller 60 and its applicator interface 70 can be configured to implement functions and communicate in a coordinated manner via pins 3, 11, 14 and 15 of the connector 75 to instruct the downstream label applicator 32. For example, the controller 60 and applicator interface 70 can have a plurality of functions including a send label format function 77, a process label format function 78, a pause for start signal function 79, a print label function 80, a void detection function 81, a void print function 82 and a next label function, as shown in FIG. 7.

In the send label format function 77, the controller 60 is configured to send label format data to the processor 62. At the processor, the label format is processed using the label format function 78 and prepared in a format understandable by the printhead 14. The controller 60 is configured via the pause for start signal function 79 to wait until the printer is ready, such as the printhead 14 being ready and the platen roller 19 having moved the web 24 into place, or any other signals from printer components required to be ready for actual physical printing.

The void detection function 81 is configured to communicate with the coupler 30 and the transceiver 42 in order to determine whether there is a failure to read from the RFID transponder 1, a failure to write to the RFID transponder or whether there is a verification failure. In a verification failure, the data is written to the RFID transponder by the coupler 30 and transceiver 42 with apparent success. Then, the data is read and compared to the supposedly written data (e.g., data stored in the controller memory 62) to ensure that the data was accurately recorded by the RFID transponder 1. If an error, failure or defect of the RFID transponder is detected by a failure to read what was supposed to have been written to the RFID transponder, the void detection function 81 is configured to re-attempt a selected number of retries (e.g., 3, 5, 7, etc.).

If the RFID transponder 1 continuously fails, then the RFID transponder is adjudged to be void and the void print function 82 is preferably executed by sending format information to the print head 14 which prints "VOID" or some other indicia indicating a void RFID transponder and label. Also, the void print function 82 reinitiates printing of the same label format by returning to the pause for start signal function 79 and awaiting the ready condition of the physical printer components which advance to a new RFID transponder 1 and label combination. Note that the void print function 82 could additionally replace or overlay the current label format with the VOID indicia for printing on the voided label.

If the RFID transponder is not void, the print label function 80 causes the printhead 14 to begin printing the processed label format and advance the web 24 accordingly. After printing, the next label function 83 is executed and various tasks preparing for a new label format are conducted, such as clearing memory of the current label format and obtaining a new label format, before returning to function 77.

Depending upon the various settings of the pins described above and in the chart of FIG. 5, the status of the various controller 60 and applicator interface board 70 functions, including whether the void detector 81 has detected a defective RFID transponder, can be communicated in different ways to the label applicator 32, or other downstream device, through the pins 3, 11, 14 and 15.

For example, communication of a non-defective RFID transponder 1 is shown by FIG. 8 and communication of a defective or void RFID transponder is shown by FIG. 9, with the pin 11 set to MODE 1. During execution of the send label format function 77 and the process label format function 78, pin 14 is set to HIGH indicating that the data is not ready, pin 3 is set to HIGH indicating the printing should not be started, pin 11 is set to HIGH indicating that the label should not be ended and pin 15 is set to HIGH (in FIG. 7) indicating that a void RFID transponder 1 has not been detected.

Pin 14 is set to low when the label processing function 78 is completed, thereby indicating that the controller 60 is waiting for a start print signal in function 79. After receipt of the start print signal satisfying function 79, pin 3 is set to HIGH communicating initiation of label printing. While the label is printing, pin 11 is set to LOW, which in MODE 1 indicates that the print engine is moving the label forward. Notably, in FIG. 9 pin 15 is set to LOW, indicating a void RFID transponder detected by the void detection function 81, between completion of the label processing by function 78 and initiation of the start print signal by function 79. In this manner, the label applicator 32, or other downstream device, can prepare itself for a voided label.

Figure 10:
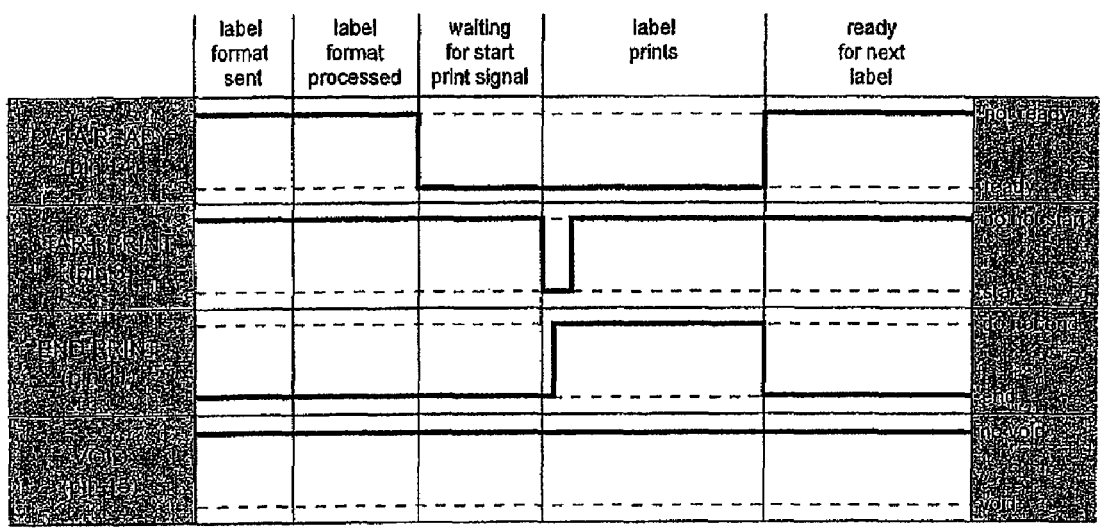
Figure 11:
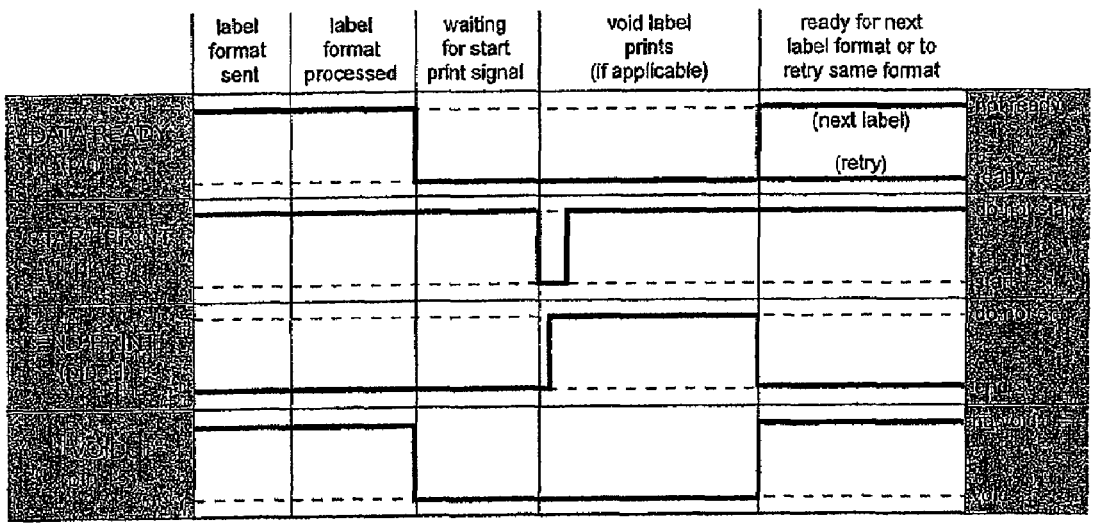

FIGS. 10 and 11 illustrate pin 11 of the applicator interface board 70 being in MODE 2, wherein the signal is set to HIGH (instead of LOW) only when the print engine is moving the label forward. FIGS. 12 and 13 illustrate MODE 3 for pin 11, wherein the output of pin 11 is normally set to HIGH during continuous printing but has a short LOW assertion for 20 milliseconds when a label has been completed and positioned. FIGS. 14 and 15 illustrate MODE 4 for pin 11, wherein the output of pin 11 is normally set to LOW during continuous printing but has a short HIGH assertion (e.g., 20 milliseconds) when a label has been completed and positioned.

In another aspect, the controller 60 system may be configured to record in the memory 62 a log of the serial, or other identifying information, about each of the RFID transponders 1, and what was read from and/or written to the RFID transponders, or which of the RFID transponders was detected to be non-functional. In addition, this log could also include a correlation with the particular label format or other information that was printed on each label, or portion of media 11, in the proximity of a particular one of the RFID transponders 1.

Illustrated in the Figures herein are block diagrams, flowcharts and control flow illustrations of methods and systems according to the invention. Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustration, and combinations of blocks or steps in the block diagram, flowchart or control flow illustration, can be implemented by special purpose hardware-based computer systems which perform the specified functions or steps, or combinations of special purpose hardware and computer instructions, such as the applicator interface board 70 embodiment of the present invention as described above.

The present invention has many advantages. For example, the media printer 16 is capable of not only reading from, and printing on, a combination of RFID transponders 1 and media 11, but also can detect erroneous or defective RFID transponders and notify downstream devices for appropriate handling with minimal interference of the printing operation. In this manner, the media printer 16 can continue uninterrupted printing, including attempting to print an image or format that was associated with a previously voided one of the RFID transponders. In addition, the controller 60 and applicator interface board 70 of the media printer 16 can be configured to substitute or overlay the image with void indicia to prevent accidental use of the voided RFID transponder. Further, when combined with a spatially selective coupler 30, quick and efficient printing on closely-spaced RFID transponders 1 supported by individual labels is possible even in the presence of improperly written to or defective RFID transponders. Also, the interface board 70 of the present invention enables communication via a standard port, such as the DB-15, to the downstream devices, enabling a "plug-and-play" type operation with different modular downstream devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A printer controller system for controlling printing on media supporting a series of RFID transponders and communicating detection of void RFID transponders to one or more downstream devices, said printer controller comprising:

a void detection system configured to communicate with a transceiver for detecting a void one of the RFID transponders supported by the media;

a printing system configured to process and communicate a formatted image to a print head for printing the formatted image on the media in proximity to one of the RFID transponders supported by the media, said printing system including a controller board having an external communication pathway wherein the external communication pathway comprises a connector originally equipped with the printer system; and a void communication system configured to communicate at least one external signal indicating detection of the void RFID transponder to the downstream device via the external communication pathway.

2. The printer controller of claim 1, further comprising a media advancement controller configured to continuously advance the media and RFID transponders even when the void RFID transponder is detected.

3. The printer controller of claim 2, wherein the media advancement controller is further configured to advance to a next RFID transponder supported on the media and wherein the printing system is further configured to re-communicate the formatted image to the print head in response to detection of the void RFID transponder.

4. The printer controller of claim 3, further comprising an end print detection system configured to determine and communicate when printing of the formatted image on the media is completed and wherein the printing system is configured to communicate a next formatted image to the print head in response to non-detection of the void RFID transponder and completed printing of the formatted image.

5. The printer controller of claim 4, wherein the printing system is configured to process and communicate void indicia to the print head in response to detection of the void RFID transponder.

6. The printer controller of claim 5, wherein the end print detection system is further configured to determine and communicate when printing of the void indicia on the media is completed.

7. The printer controller of claim 6, wherein the void communication system is further configured to maintain the external void signal through communication of the void indicia to the print head and determination and communication of when printing of the void indicia on the media is completed.

8. The printer controller of claim 1, wherein the connector is a multiple pin connector.

9. The printer controller of claim 1, wherein the connector is a fifteen pin connector.

10. A printer for printing on a media supporting a series of RFID transponders in coordination with a downstream device, said printer comprising:
    a print head configured to print on the media;
    at least one transceiver configured to communicate with the RFID transponders on the media;
    a media supply system configured to advance the media past the print head and the transceiver; and
    a printer controller system for controlling printing by the print head and advancement of the media supply system, said printer comprising:
        a void detection system configured to communicate with the transceiver for detecting a void one of the RFID transponders supported by the media;
        a printing system configured to process and communicate a formatted image to the print head for printing the formatted image on the media in proximity to one of the RFID transponders supported by the media; and
        a void communication system configured to communicate at least one external signal indicating detection of the void RFID transponder to the downstream device said printer controller including a controller board that communicates via an external communication pathway wherein the external communication pathway comprises a connector originally equipped with the printer.

11. The printer of claim 10, wherein the printer controller system further comprises a media advancement controller configured to communicate with the media supply system to continuously advance the media and RFID transponders even when the void RFID transponder is detected.

12. The printer of claim 11, wherein the media advancement controller is further configured to advance to a next RFID transponder supported on the media and wherein the printing system is further configured to re-communicate the formatted image to the print head in response to detection of the void RFID transponder.

13. The printer of claim 12, wherein the printer controller system further comprises an end print detection system configured to determine and communicate when printing of the formatted image on the media is completed and wherein the printing system is configured to communicate a next formatted image to the print head in response to non-detection of the void RFID transponder and completed printing of the formatted image.

14. The printer of claim 13, wherein the printing system is configured to process and communicate void indicia to the print head in response to detection of the void RFID transponder.

15. The printer of claim 14, wherein the end print detection system is further configured to determine and communicate when printing of the void indicia on the media is completed.

16. The printer of claim 15, wherein the void communication system is further configured to maintain the external void signal through communication of the void indicia to the print head and determination and communication of when printing of the void indicia on the media is completed.

17. The printer of claim 10, wherein the connector is a multiple pin connector.

18. The printer of claim 10, wherein the connector is a fifteen pin connector.

19. A method of printing on a media supporting a series of RFID transponders and communicating detection of void RFID transponders to one or more downstream devices, said method comprising:
    processing and communicating, using a printer system, a formatted image to a print head for printing the formatted image on the media in proximity to one of the RFID transponders supported by the, media;
    communicating with a transceiver to detect a void one of the RFID transponders supported by the media; and
    communicating via an external communication pathway at least one external signal indicating detection of the void RFID transponder to the downstream device wherein the external communication pathway comprises a connector originally equipped with the printer system.

20. The method of claim 19, further comprising continuously advancing the media and RFID transponders even when the void RFID transponder is detected.

21. The method of claim 20, further comprising advancing to a next RFID transponder supported on the media and re-communicating the formatted image to the print head in response to detection of the void RFID transponder.

22. The method of claim 21, further comprising determining and communicating when printing of the formatted image on the media is completed and communicating a next formatted image to the print head in response to non-detection of the void RFID transponder and completion of printing of the formatted image.

23. The method of claim 22, further comprising processing and communicating void indicia to the print head in response to detection of the void RFID transponder.

24. The method of claim 23, further comprising determining and communicating when printing of the void indicia on the media is completed.

25. The method of claim 24, further comprising maintaining the external void signal through communication of the void indicia to the print head and communication of when printing of the void indicia on the media is completed.

26. The method of claim 19, wherein the connector is a multiple pin connector.

27. The method of claim 19, wherein the connector is a fifteen pin connector.

* * * * *